Figure 3:
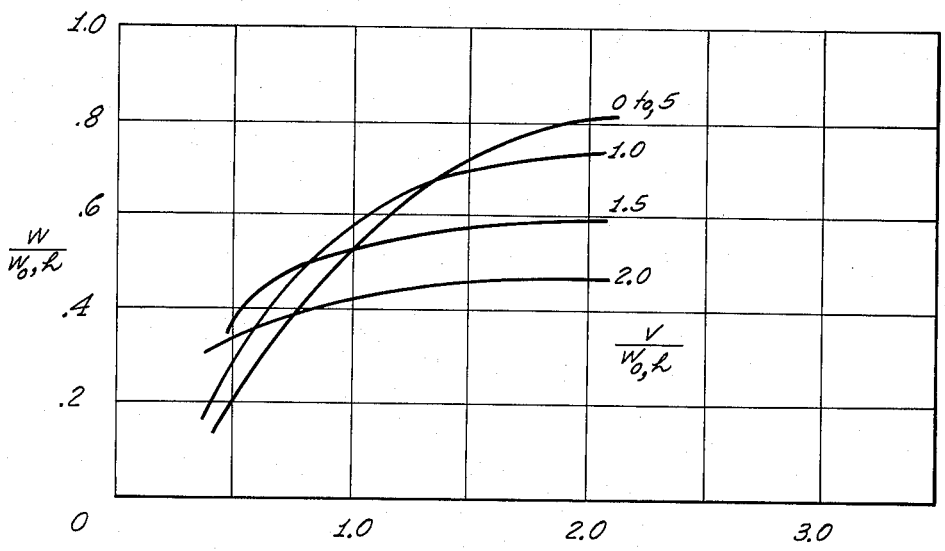

May 10, 1966  W. SCHWARTZ  3,250,121
HELICOPTER GROUND PROXIMITY INDICATOR
Filed Jan. 31, 1964  3 Sheets-Sheet 1
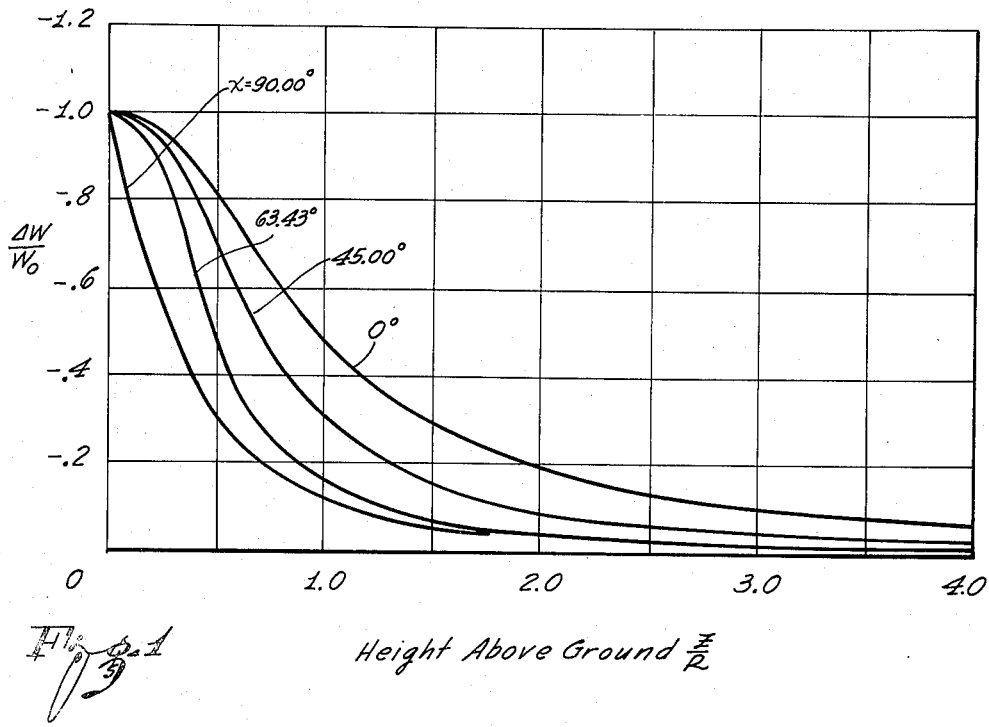
Fig. 1    Height Above Ground $\frac{Z}{R}$
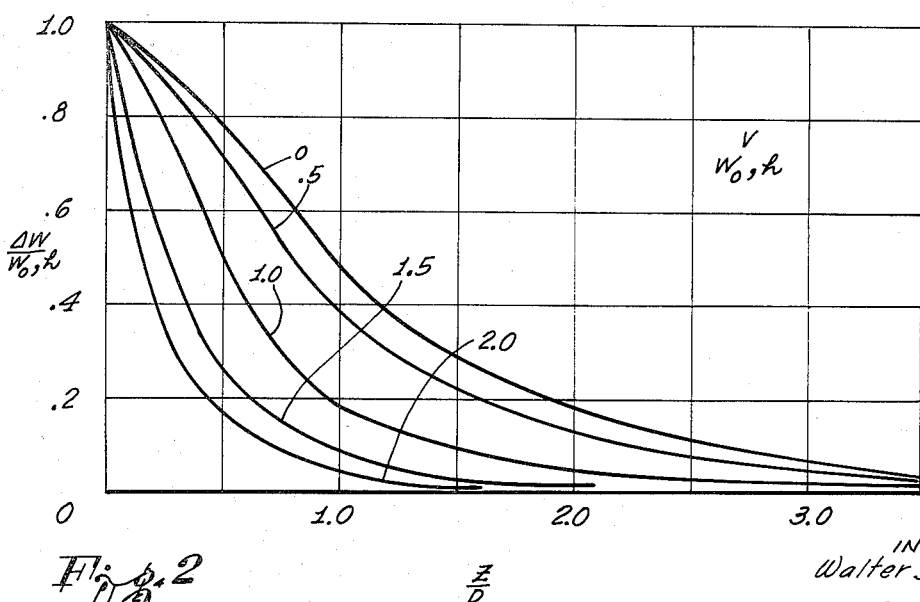
Fig. 2    $\frac{Z}{R}$
INVENTOR
Walter Schwartz
By Smyth, Roston & Pavitt
Attorneys INVENTOR:
Walter Schwartz Attorneys INVENTOR:
Walter Schwartz Attorneys United States Patent Office 3,250,121
Patented May 10, 1966

3,250,121
HELICOPTER GROUND PROXIMITY INDICATOR
Walter Schwartz, Northridge, Calif., assignor to Conductron Corporation, Ann Arbor, Mich., a corporation of Delaware
Filed Jan. 31, 1964, Ser. No. 341,634
19 Claims. (Cl. 73—178)

The present invention relates to a helicopter ground proximity indicator and more particularly to a system which provides the helicopter pilot with an indication of the helicopter's proximity to the ground during landing, as well as during flights close to the ground.

It is an object of the present invention to provide a new helicopter ground proximity indicator that is a passive, non-cooperative system which is especially useful during hostile landing operations in the dead of the night or during extremely adverse weather conditions, and has utility as an altitude control for close to the ground operations such as crop dusting and other sowing operations.

It is a specific feature of the present invention to make use of the ground-effect influence upon the air flow through the helicopter rotors and to utilize the decrease of such ground effect with increased height. When a helicopter approaches the ground, the wake produced by the rotor is reflected by the ground, so that the effective wake is actually reduced in comparison with the wake directly induced by the helicopter rotor. This reflection of the induced wake is also called upwash.

It will be appreciated that the effect of the upwash upon the rotor is maximum when the helicopter is in close proximity to the ground and it will also be understood that there is little or no upwash when the rotor is rather high above ground. When the craft flies horizontally, the upwash will be laterally deflected from the rotor axis, since the wake in such case is not directed straight down. Accordingly, the upwash will reduce the wake to a lesser extent with an increase in forward speed.

It is a significant feature of this invention that the actual wake can be measured directly at all altitudes and that the induced wake is determined by making comparison of the wake conditions at different altitudes for a given engine; rotor; and speed conditions.

According to one aspect of the present invention, in a preferred embodiment thereof, it is suggested that measuring instruments be provided to determine quantitatively the components necessary to calculate the induced wake. As will be developed more fully below, such instruments include the blade angle potentiometer, a rotor speed measuring device, the horizontal velocity transducer and a skew angle potentiometer. Since these quantities are related to each other by way of rather simple arithmetic and trigonometric functions, the induced wake can simply be computed continuously during the flight. The output thus produced is compared with the true wake which is being measured directly. The result of such comparison is then being correlated with predetermined functions yielding directly the ground effect in relation to height, and from such correlation the height is being determined.

According to a further aspect of the invention, a signal is being derived from relevant data taken from the helicopter machinery, which signal is representative of the product of rotor speed and the square root of the thrust coefficient. The ratio of true wake over this signal is related to the height of the craft above ground by a substantially experimental function which includes at a given horizontal speed only the rotor radius as parameter.

According to a still further aspect of the invention, it is suggested to continuously measure the true wake during ground approach, which wake includes induced wake and a wake interfering component due to upwash. The result of this measurement is then compared with, or correlated to, for example, the signal representative of the induced wake. For such comparison one can employ, alternatively or additionally, a signal which is representative of the product of rotor speed and the square root of the rotor thrust coefficient. The signal or signals used for such comparison or correlation are solely derived from the machinery of the craft and represent effects produced by the rotor without upwash.

The result of the comparison of the true wake with the latter signal or signals is then subjected to nonlinear transmission, whereby the characteristics of such transmission may be varied in response to the horizontal velocity of the craft. The transmission may be had by way of digital or analog computing means, or by simple nonlinear transducing elements of electrical or mechanical type.

Figure 4:
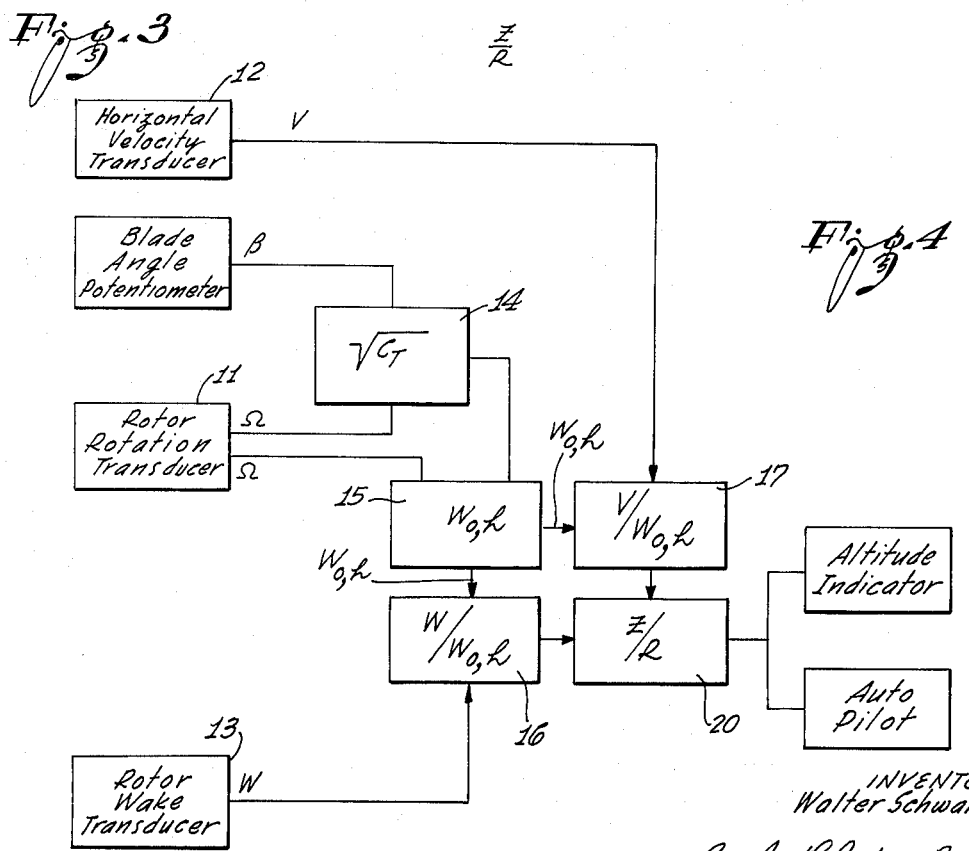
Figure 5:
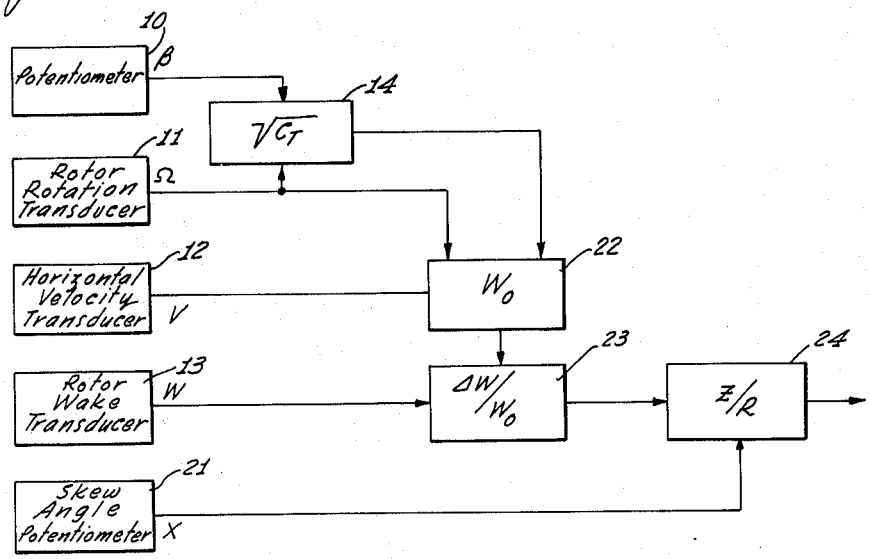
Figure 6:
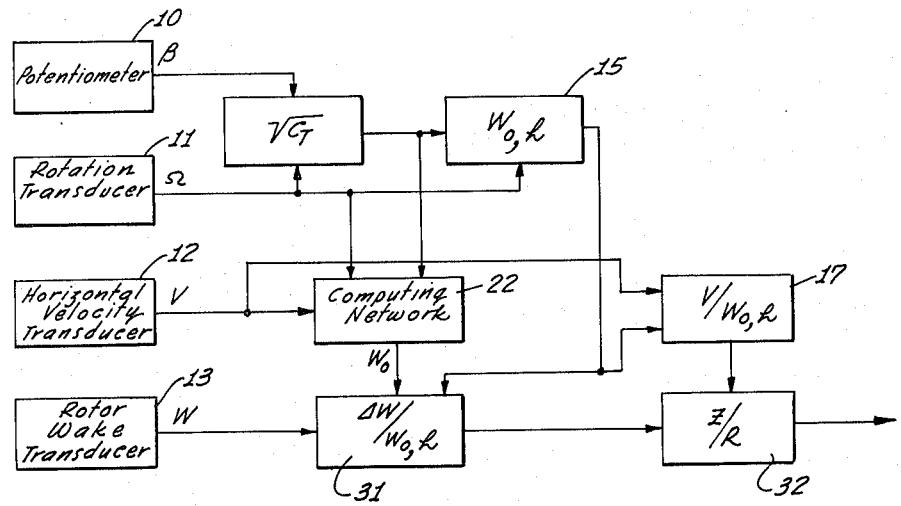

While the specification concludes with claims particularly pointing out and distinctly claiming the subject matter which is regarded as the invention, it is believed that the invention, the objects and features of the invention, and further objects, features and advantages thereof, will be better understood from the following description taken in connection with the accompanying drawings:

FIGURES 1, 2 and 3 are diagrams in which the wake is plotted against distance from ground; ordinate and abscissa show relative scales so that the curves represent data without dimensions, the parameters used indicate the effect of forward velocity, and FIGURES 4, 5, and 6 illustrate block diagrams as schematic representations of systems for practicing the invention.

Before proceeding to the detailed description of the drawing, several important formulas and relations shall be explained. The wake velocity $W_0$ induced by the rotor of a helicopter without ground effect, i.e., at altitudes sufficiently far above ground, is determined by the following formula:

(1) $$W_0 = \frac{-1/2 C_T \Omega . R}{\sqrt{\mu^2 + \lambda^2}}$$

wherein $C_T$ is the rotor thrust coefficient commonly determined by the following formula:

(2) $$C_T = \frac{\text{Thrust}}{\rho \pi . R^2 (\Omega . R)^2}$$

$\Omega$ (Omega) in this formula is the rotational speed of the rotor commonly measured in radiants per second. R is the radius of the rotor. $\mu$ (Mu) is the rotor tip speed ratio and is determined by the following equation:

(3) $$\mu = \frac{V \cos \alpha}{\Omega . R}$$

$\lambda$ (Lambda) is the rotor in flow ratio and is determined by:

(4) $$\lambda = \frac{V \sin \alpha + W_0}{\Omega . R}$$

$\alpha$ (Alpha) is the rotor tip plane angle of attack, measured in degrees and $\rho$ is the mass density of air measured in slugs per cubic feet.

It will be appreciated that R, alpha and $\rho$ are predetermined quantities and particularly R and alpha are quantities which are characteristic of the craft used. The rotational speed of the rotor speed Omega is a quantity that is susceptible to measurement; so is V, the forward velocity of the craft. Of course, during straight ascending or descending motion or during hovering, V will be zero.

It follows that the induced wake velocity, still without ground effect, but with a forward velocity of zero is given by a formula resulting from Equation 1 with $V=0$.

(5)
$$W_{0,h} = -\Omega . R . \sqrt{\frac{C_T}{2}}$$

The induced wake, of course, is an air flow having a downwardly directed component. Even during straight forward flight of a helicopter, there still is a substantial amount of induced wake directed towards ground. As soon as the craft approaches ground, there is an increased amount of air reflected in upward direction, inhibiting the induced wake. This ground effect is also called upwash, as already stated. During hovering, or during straight down descent or ascent, such upwash has its principal component directed straight up. During forward flight, with or without descent, the upwash only partially affects the craft, and of course, for increase in forward speed, the upwash would influence the wake of the craft only to a very small amount.

The upwash, in any event, causes the true wake $W$ to differ from the induced wake $W_0$, by an amount which can be described as interference velocity $\Delta W$. Accordingly, there is the equation, (6) $\qquad \Delta W = W - W_0$ A Pitot tube affixed close to the center of the rotor of the helicopter will, for a given craft, measure the wake speed which is the true wake and not the induced wake. Accordingly, the Pitot tube will measure $W$ which includes, according to Formula 6, the induced wake $W_0$ and the interference velocity $\Delta W$. It has been found that the interference velocity depends upon the altitude of the craft by a uniform function.

This function, however, includes as parameter the forward motion of the craft. It has further been found that this relationship of ground effect and altitude follows an exponential function; that is to say, the ground effect exponentially decreases with decreasing height.

Turning now to FIGURE 1, there are plotted various curves representative of the interference velocity. The ordinate of the diagram includes the ratio of $\Delta W/W_0$ as defined above. This ratio can also be written as $W-W_0/W_0$ in accordance with Formula 6.

According to Formula 1, $W_0$ depends primarily upon the thrust developed by the craft, the rotational speed of the rotor, and the forward velocity, if any, as variable components. The rotor radius R and angle of attack alpha are known dimensions of the craft as already stated; and the air density is, of course, known, and can be determined solely by determining and measuring quan- the degree of accuracy required. Accordingly, $W_0$ can be determined solely as determining and measuring quantities of machine parts of the craft. Usually the variable quantities are already measured in a conventional helicopter; in other words, measuring instruments for the quantities of interest are already provided for in the craft, so that electrical output signals representative of such measured quantities will already be available for further evaluation.

The abscissa of the diagram of FIGURE 1 and, for that matter, the abscissa of all diagrams shown here, shows the ratio of altitude Z over rotor radius R. It has been found that there is a direct relation between the size of the rotor and the ground effect, so that in effect, the intensity of the ground effect increases to the same degree with the decreased height and an increased rotor radius. Accordingly, the ground effect, when plotted against the distance measured in units of rotor radius, yields comparative results for various crafts. Therefore the curves plotted in FIGURE 1 and also the other figures, are valid for different types of helicopters.

Upon measuring the true wake W directly, and determining $W_0$, the ordinate values are being obtained, and such ordinate values can be used again. The ordinate values leading to the curves plotted in FIGURE 1 have been measured, on the one hand, and the curves can be used for reference in that any new determination of $\Delta W/W_0$ can be used for obtaining abscissa values.

The parameter used in FIGURE 1 is the skew angle $x$, which is the angle of the rotor axis of rotation relative to the vertical direction. Accordingly, during hovering flight, or during straight ascent or straight descent, the skew angle $x$ is zero. As one can see from FIGURE 1, the ground effect is effective for rather large distances from ground in case of $x=0$, because the upwash then is straight up, yielding large values for the interference velocity $\Delta W$. Of course, for a skew angle of 90°, the ground effect is not too noticeable even for low heights. It is apparent that the interference velocity $\Delta W$ will approach $W_0$ very close to ground. Hence, all curves converge towards origin.

It has been found, further, that the interference velocity $\Delta W$ can be plotted with the use of different parameters which, in cases, might facilitate quantitative determination.

In FIGURE 2 there is shown the ratio of interference velocity $\Delta W$ over induced wake during hovering flight, $W_{0,h}$, plotted against $Z/R$. The ratio of forward velocity V over induced wake at hovering flight $W_{0,h}$ is the common parameter. The value of $W_{0,h}$ is more readily determinable than $W_0$, as can be seen by comparing Equations 1 and 5. FIGURE 2 shows that again there is a significant influence of the forward velocity on the ground effect. However, the curves in FIGURE 2 still include as a quantity $W_0$ in view of Formula 6 for the interference velocity. Hence, a determination of the height in this case requires the determination of $W_0$ as well as $W_{0,h}$.

The group of curves plotted in FIGURE 3 permits a simpler way of altitude determination and therefore constitutes the preferred way of practicing the invention. FIGURE 3 shows values for the ratio of $W/W_{0,h}$ plotted against $Z/R$ with $V/W_{0,h}$ as common parameter. Accordingly, the height of the craft measured in units of the propellor radius can be determined by (1) measuring the forward speed; (2) measuring the rotational speed of the rotor, and (3) determining the thrust.

Forward velocity and rotor speed are, of course, measured in most craft, as already stated, so that signals representing forward speed and rotational speed are already available in the helicopter. The thrust is primarily determined by the rotor blade angle Beta usually sensed by a potentiometer linked to the mechanism pivoting the rotor blades. Accordingly, it is not difficult and does not require large expenditures, to determine the induced wake for a hovering flight $W_{0,h}$ as a characteristic value for momentary flight conditions in order to obtain the ratio $W/W_{0,h}$. Of course this latter ratio is unity at large heights and as long as there is no forward velocity. The ratio $W/W_{0,h}$ decreases when the craft approaches ground and it has been found advisable to employ means permitting use of the relationship shown in FIGURE 3 to determine the altitude of the craft.

It is a significant feature of the present invention that no probing signal needs to be transmitted or emitted from the craft to be directed towards ground and to be received for purposes of measuring the height. Use is being made solely from the upwash produced by the propellors. Any measurement proper requires instrumentation only for sensing values at or in the craft itself. Wave or other signal transmission characteristics as existing between the craft and ground, do not participate in the determination of the altitude.

Proceeding now to the description of FIGURE 4, there are shown in symbolical representation several transducers and sensing devices monitoring pertinent values of the craft and its machinery as well as its immediate environment during the flight. The system shown in FIGURE 4 specifically makes use of the curves plotted in FIGURE 3.

There is first provided a potentiometer 10 linked to the mechanism (not shown) pivoting the rotor blades about their respective supporting study. The potentiometer device 10 may already include wirings furnishing directly trigonometric functions of the angle beta. Thus, there may be provided a sine potentiometer as well as a cosine potentiometer with their taps linked to the blade pivoting mechanism and furnishing output voltages respectively representing sine and cosine values of that angle beta.

There is next provided a rotor rotation transducer 11 which may be a conventional r.p.m. meter furnishing the voltage which is representative and preferably directly proportional to the rotor speed omega.

Reference numeral 12 denotes a speedometer measuring the forward, i.e., horizontal velocity V of the craft.

These instruments are usually already present in a craft, and the electrical signals furnished in such instrument can readily be used. Finally, there is provided a true wake measuring device 13, which wake measuring instrument may comprise a Pitot tube mounted close to the rotor shaft so as to measure the true wake as it exists in the vicinity of the rotor plane; or if not centered, 3 averaging Pitot tubes would be mounted radially from the rotor shaft.

It should be mentioned that in case the curve with parameter zero is being used for measuring the height of the craft above ground, no horizontal velocity transducer is required—in other words, if the forward speed does not participate in the computation of the quantities of interest, only the elements 10, 11 and 13 are required.

In case the forward velocity is a salient factor to be considered, there will be used a horizontal velocity transducer 12, which transducer very likely is already present in the craft.

Potentiometer device 10 and transducer 11 feed the respective output signals to a first network 14, combining the two signals respectively representing Omega and Beta to form a composite signal which is either the thrust coefficient $C_T$ itself or the square root thereof.

There is next provided a network 15 which can also be called a computing network combining the output of network 14, i.e., the signal representing $C_T$ or the square root thereof, with the output of transducer 11. The purpose of network 15 in this instance is to reproduce the induced wake for hovering flight as a computed reference quantity.

It is important to note that for each set of values such as rotational speed omega of the rotor, the blade angle beta, and thrust, there exists a corresponding value for $W_{o,h}$ regardless of whether or not the craft is, in fact, hovering, ascending, descending or in forward flight. Hence, for purposes of ascertaining the height of the craft above ground, it is significant for this mode of practicing the invention that the induced wake for hovering flight $W_{o,h}$ is being determined and used as one factor for determining the height of the craft above ground, even though the actual wake as well as the wake, as actually induced by the craft, differ from the induced wake for hovering flight under like conditions as theoretical value. In other words, it is significant that in a helicopter moving above ground in forward direction, there exists momentarily a set of quantities such as Beta and Omega, permitting computation of a value $W_{o,h}$, even though the induced wake differs from this purely theoretical value $W_{o,h}$, but still this latter value $W_{o,h}$ is being used for altitude determination.

As one can see from Formula 5, network 15 may comprise a simple voltage multiplier for the voltage signal representing rotational speed Omega and the voltage signal representing the square root of $C_T$. Constant quantities, such as 2 and R are merely a matter of calibration of such multiplier. Such calibration can be simply carried out in adjusting the network 15 so that its output equals that furnished by the rotor wake transducer 13 during a hovering flight at high altitude.

It will be appreciated that thereby not even an individual calibration of any of the measuring instruments is necessary. For the purpose of determining the altitude, formation of the ratio $W/W_{o,h}$ is required. The signals individually representing W and $W/W_{o,h}$ will preferably be offered on a linear scale. During a high altitude flight test (hovering flight), the ratio of the outputs of network 15 and of transducer 13 is determined to constitute unity for purposes of reproducing the scale of the curves of FIGURE 3, so that the absolute values of either output are unimportant, and intermediate values for $W/W_{o,h}$ will automatically be smaller than unity of such scale. In other words, it is not necessary to calibrate the output of transducers 11 and 13 individually towards any particular scale such as volts vs. foot per second, etc.

Having thus established what types of values for W and for $W/W_{o,h}$ are comparable with each other, such values in form of electrical signals, for example, voltages, are being fed to a voltage signal dividing network 16 forming a signal representing the ratio $W/W_{o,h}$. The output produced by this network 16 during a hovering flight at high altitude will be regarded as scale unity. Of course, very close to ground, the output of network 16 has to be zero, since wake transducer 13 must produce zero at ground.

The range in which the ratio $W/W_{o,h}$ can vary is limited and definite, and this range has as marginal values on a comparable scale 1 and 0. Accordingly, any further evaluation and computation in either the analog or the digital mode preferably starts out with the ratio $W/W_{o,h}$ as an analog variable, and if further computation is to be had in the digital mode, the network 16 may already include an analog-to-digital converter so that the output of network 16 is a series of digital values, for example, a set of binary bits representing the aforementioned ratio.

In the following, it shall be assumed that the output of network 16 is represented as an analog value, as for example, by a voltage varying between an arbitrary value representing unity and directly zero.

Returning briefly to FIGURE 3, it can be seen that for complete evaluation and precise measurement it is necessary to provide for a parameter $V/W_{o,h}$. On the other hand, one can see, that the range covered by a parameter between 0 and about 1, can be approximated by a single nonlinear curve, therefore, for the moment, it shall be assumed that the inventive device is wired and laid out only to accommodate straight ascent or straight descent with little or no forward flight to be accounted for.

As long as the forward velocity V can be neglected, the output value of network 16 can be used to directly furnish the height of the craft above ground. The computing device 20 to which the output of network 16 is being fed may, in this case, comprise a simple electrical or mechanical linkage of the nonlinear type, i.e., the network 20 may be constituted by a nonlinear transducer having, in effect, the characteristics as plotted by a curve for parameter zero. Alternatively, the transducer characteristics may reproduce an interpolated curve approximating a suitable parameter within the range 0 through about 1. Semi-conductor and magneto restrictive devices can readily be employed for such nonlinear transducing action whereby the output within a suitably calibrated scale directly yields the value $Z/R$ or, if the calibration includes the rotor radius, the output can be directly the height Z of the craft above ground.

It should be mentioned that the approximation by an interpolating curve to be used for straight descent as well as low forward speeds of the craft, does not produce a considerable error in view of the fact that for $Z/R=0$ also the wake is 0, so that all curves converge more or less rapidly towards origin. Also, terminal landing operations are usually carried out by a straight down descent. The invention is particularly intended to cover the final landing phase when the plane is hovering over ground, and where the pilot is unable to see the ground due to adverse weather or visibility conditions. Accordingly, the device which does not use the forward velocity as a parameter might still be sufficient to yield useful results.

In case forward speed cannot be neglected, a network 17 is provided to form the ratio of the output of the horizontal velocity transducer 12 and of network 15, in order to provide for the dimensionless parameter $V/W_{o,h}$ as used in the curves plotted in FIGURE 3. It will be appreciated that the inventive apparatus will still not be very complicated because the output signal of comparator network 17 can be used, for example, to control a variable bias applied to an electrical transducing element constituting the computing device 20; or the output of comparator network 17 can be used to adjust a mechanical linkage in computing device 20 so as to accommodate such transducing element to the various curves for purposes of nonlinear transmission between input and output. Hence, with still little more additional equipment, a large range of parameter can be covered so that the network 20 can be comprised of rather simple elements still yielding sufficiently accurate results. The scaling of the output of comparator 17 is again arbitrary and needs to accommodate only the adjustable transducing element or the adjustable linkage in computing device 20 so as to approximate each of the several curves as plotted in FIGURE 3 within the desired degree of accuracy. If a higher degree of accuracy is required, employment of a more sophisticated and conventional type digital computer seems to be advisable.

An incremental digital computer of the DDA variety could be used as a polynomial function generator, i.e., such generator would be set up to solve equations of the form:

$$Y = K_0 + K_1 X^2 + K_2 X^2 + K_3 X^3 + \ldots$$

with X being an input or an intermediate variable and Y being the output variable. The coefficients such as $K_0$, $K_1$, etc. are generally evaluated from test data. By allowing X to be either the variable or the logarithm of the variable, virtually any natural function can be approximated within practical accuracies, i.e., consistent with the input sensors and still using only low order polynomials. This computer would sequentially solve five such polynomials, each representing the steps in the computation of FIGURE 4. The coefficients are set into the computer through a keyboard switch and checkout panel.

If the output side of networks 16 and 17 includes analog to digital converters so that the values for $W/W_{o,h}$ and for $V/W_{o,h}$ are represented by digital values, the computing device 20 then being of a more sophisticated device has to approximate the curves of FIGURE 3 only by way of two series of polynomial functions according to the following sets of equations:

$$\frac{Z}{R} = K_0 + K_1 \frac{W}{W_{o,h}} + K_2 \left(\frac{W}{W_{o,h}}\right)^2 + \ldots$$

and $$K_0 = A_{00} + A_{01} \frac{V}{W_{o,h}} + A_{02} \left(\frac{V}{W_{o,h}}\right)^2 + \ldots$$

$$K_1 = A_{10} + A_{11} \frac{V}{W_{o,h}} + A_{12} \left(\frac{V}{W_{o,h}}\right)^2 + \ldots$$

A digital computing device of the polynomial generator type then simply has to perform serial multiplications with the coefficients $A_{00}$, $A_{01}$, $A_{10}$, etc. being fixed values with which the computer is being charged initially through the keyboard, and which coefficients include no specific data for the helicopter, because the relation between the outputs of networks 16 and 17 is determined only by the dimensionless curves plotted in FIGURE 3, and there is no dependency any more upon any data taken from the craft.

The accuracy attained, of course, depends on the number of coefficients used, i.e., the order of the polynomials. The computing device, however, can again be simplified in view of the following discovery: The ground effect, in general, is one which decreases exponentially with increasing altitude. Accordingly, between the ratio $W/W_{o,h}$ and the logarithm of $Z/R$ is an almost linear relationship. Accordingly, the still accurate but highly simplified approximation yields the following equation:

(7) $$\frac{W}{W_{o,h}} = C_0 + C_1 \log \frac{Z}{R}$$

Using Equation 7 as base formula for computation, only the coefficient $C_0$ and $C_1$ are to be approximated again by polynomials introducing the parameter $V/W_{o,h}$ and being possibly of higher than the first order. The polynomial order depends, of course, on the degree of accuracy desired. The linearization possible with Equation 7 and made possible through the use of the logarithm of $Z/R$ is desirable since an indicating instrument to be connected to the output side of the computing device 17, though being the logarithm of $Z/R$, can readily be calibrated to directly display $Z/R$ then on a nonlinear scale. If the power of resolution of the instrument is sufficiently high, the height Z of the craft can be indicated with appropriate accuracy. Again, if the instrument is calibrated to accommodate the particular rotor used in the craft, the instrument may yield directly the height Z, on a nonlinear scale but with sufficient resolution so that the pilot is informed about the altitude with sufficient accuracy.

As a modification it is, for example, possible to combine the networks 15, 16, 17 and 20 into one computing device having as inputs the output of network 14, the output of rotor rotation transducer 11, the output of the horizontal velocity transducer 12 and the output of the rotor wake transducer 13. The various relationships as then presented by the aforementioned Formula 5 as well as by the several curves shown in FIGURE 3, are then respectively approximated by polynomial functions, and the various constants and coefficients thereof are being given initially into the computer representing and including primarily the constant data of the helicopter such as its rotor radius R, the angle of attack alpha, and the density of air.

At this point it should be mentioned that undoubtedly the nature of the landing site and its textural characteristics will have an effect on the interference velocity $\Delta W$ and, of course, on the true wake as sensed by the transducer 13. For example, it can be expected that a hard concrete surface will reflect the wake more thoroughly and create more upwash than soft or grassy surfaces. Since the mission conditions of a helicopter may very well require the setting down in woods, forest, fields, etc. it can be assumed that the proximity system is being calibrated in fact for this class of surface texture. Should there be any significant difference between the hard and soft surface, however, the soft surface setting would be conservative for the pilot since, in his descent to a hard landing site, he would believe he was lower than actually and merely follow more cautiously for the last few feet of descent.

Proceeding now to the description of FIGURE 5, there is shown that a still simple network can be designed which, in effect, reproduces the curves plotted in FIGURE 1.

The basic transducing and sensing elements are the same as used in the network shown in FIGURE 4. Thus, there is a blade angle potentiometer 10, the output of which gives the blade angle Beta of the rotor blade; there is provided the rotation transducer 11, the output Omega of which is indicative of the rotor rotation; the outputs of transducers 10 and 11 are combined in the network 14 producing as output the thrust coefficient $C_T$ or the square root thereof, also as previously described. There is also provided the horizontal velocity transducer 12, the output V of which is required for the determination of the induced wake.

Of course, the primary input sensor is the true wake measuring device, i.e., the wake transducer 13. Different from FIGURE 4 in this embodiment is the provision of a potentiometer 21 sensing the skew angle of the rotor hub. The potentiometer 21 may be wired to furnish the skew angle $x$ in a convenient scale so that its output can be used as a parameter to approximate the various curves in the most convenient manner. It is important to note that by properly wiring the potentiometer 21 one can accommodate and simplify the approximation made by a computing device evaluating the individual curves of FIGURE 1.

The embodiment shown in FIGURE 5 includes now a computing device 22 combining the outputs of transducer 11, of network 14 and of transducer 12 in accordance with Formula 1 so as to produce the true induced wake $W_0$. This computing network 22 may comprise a polynomial generator of the type described above in which case either the input side thereof or the output side of elements 11, 12, 14 is comprised with analog-to-digital converters.

The output of computing device 22 is fed to a comparator 23 receiving the output of the wake transducer 13 so as to form the ratio $\Delta W/W_0$. The output of comparator 23 is then fed to computing device 24 serving to correlate the output of network 23 with the ratio $Z/R$ in accordance with the curves plotted in FIGURE 1. Again this correlation can be had by polynomial approximation preferably in the digital mode. The output of skew angle $x$ sensing potentiometer 21 is fed to the computing device 24 as the determining parameter. As far as the apparatus is concerned, the evaluation of the outputs of elements 23 and 21 can be had by a similar device as that set forth above with reference to computing device 20. Again it can be said that the curves shown in FIGURE 1 can be approximated by logarithm functions and the relationship between $\Delta W/W_0$ and the logarithm of $Z/R$ can be approximated by a linear curve in the manner outlined above.

Proceeding now to the description of FIGURE 6, there is shown a network in which the curves plotted in FIGURE 2 are being used for measuring the height of a helicopter above ground. Again a number of elements are similar to those used in the aforedescribed embodiment: There is the blade angle potentiometer 10, the rotation transducer 11, the horizontal velocity transducer 12 and the rotor wake transducer 13; there is also the network 14 for forming the thrust coefficient $C_T$ or the square root thereof. Also, there is provided a network 22 for calculating the induced wake $W_0$ out of the output of elements 11, 12 and 14.

This embodiment, furthermore, employs the aforedescribed network 15 which is a multiplier forming the value $W/W_{0,h}$ out of the outputs of transducer 12 and of multiplier 15.

Different from the aforedescribed embodiment is the provision of a network 31 which combines the output of computing device 22, of comparator 17 and of the true wake transducer 13 in order to form the ratio $W-W_0/W_{0,h}$. The output of this network 31 represents the ordinate values in FIGURE 2 to be correlated again in accordance with the curves plotted in FIGURE 2. The computing device 32 corresponds to the devices 20 and 24 described above. And again the two-step approximation by way of polynomial functions can be used as outlined above, using a set of parameters to approximate the curves shown in FIGURE 2. The parameter in this case is determined by the output of comparator 17.

It will be appreciated that the output values to be derived from any of the computing devices described above, such as 20, 24 and 32, can be used to either indicate directly the altitude or to control an autopilot.

The invention is not limited to the embodiments described above, but all changes and modifications thereof, not constituting departures from the spirit and scope of the invention, are intended to be covered by the following claims.

What is claimed is:
1. Helicopter ground-proximity measuring device, comprising:
   means for measuring the true wake of the helicopter rotor and producing a first signal responsive thereto;
   means responsive to the induced wake by the helicopter rotor and producing a second signal responsive thereto; and
   means for correlating the ratio of said first and said second signals with an exponential function generator.
2. Helicopter ground-proximity measuring device comprising:
   means for measuring the true wake of the helicopter rotor; and
   means for correlating the output of said measuring means with the output of an exponential function generator indicative of the induced wake of the helicopter to provide an indication of altitude.
3. Helicopter ground-proximity measuring device, comprising:
   means for measuring the true wake of the helicopter rotor adjacent its center and producing a first signal responsive thereto; and
   nonlinear transmission means for transforming said first signal into a second signal indicative of altitude, said transmission means including
   means for varying the transmission characteristics thereof in response to the rotor thrust and rotor speed of the helicopter.
4. Helicopter ground-proximity measuring device, comprising:
   means for measuring the true wake of the helicopter rotor adjacent its center, and producing a first signal responsive thereto;
   signal transmission means connected to the means for measuring and having exponential characteristics which are varied in response to the rotor thrust and rotor speed of the helicopter whereby an output indicative of altitude is produced.
5. Helicopter ground-proximity measuring device, comprising:
   means for measuring the true wake of the helicopter rotor adjacent its center, and producing a first signal responsive thereto; and
   nonlinear transmision means for transforming said first signal into a second signal indicative of altitude, said transmission means including means for varying the transmission characteristics thereof in response to the forward velocity of the helicopter and the thrust and speed of the rotor.
6. A method of determining the altitude of a helicopter above ground at low heights, comprising:
   determining the true wake of the rotor, determining the induced wake, and correlating the ratio of the true and induced wake to an exponential function to determine the craft's altitude.
7. Helicopter ground-proximity measuring device, comprising:
   means for measuring the true wake of the helicopter rotor and producing a first signal in response thereto;
   means for measuring the thrust of said rotor and producing a second signal in response thereto;
   means responsive to said second signal and forming a third signal indicative of induced wake velocity without ground effects; and
   means for combining said first and third signals for producing a signal proportional to the altitude of the craft.

8. Helicopter ground-proximity measuring device, comprising:
- means for measuring the true wake of the helicopter rotor adjacent its center, and producing a first signal responsive thereto;
- means responsive to the thrust produced by the helicopter rotor and producing a second signal representative thereof;
- means for sensing the helicopter rotor-rotation and producing a third signal representative thereof;
- means for combining said second and third signals for producing a fourth signal indicative of the induced wake; and
- means for combining said first and fourth signals for producing an output indicative of the altitude of the helicopter.

9. Helicopter ground-proximity measuring device, comprising:
- means for measuring the true wake of the helicopter rotor adjacent its center, and producing a first signal responsive thereto;
- means responsive to the thrust produced by the helicopter rotor and producing a second signal representative thereof;
- means for sensing the helicopter rotor-rotation and producing a third signal representative thereof;
- means for combining said second and third signals for producing a fourth signal indicative of the product of the rotor rotation and the square root of the thrust coefficient; and
- means for combining said first and fourth signals for producing an output indicative of the altitude of the helicopter.

10. Helicopter ground-proximity measuring device, comprising:
- means for measuring the true wake of the helicopter rotor adjacent its center, and producing a first signal responsive thereto;
- means responsive to the thrust produced by the helicopter rotor and producing a second signal representative thereof;
- means for sensing the helicopter rotor-rotation and producing a third signal representative thereof;
- means for combining said second and third signals for producing a fourth signal indicative of the product of the rotor rotation and the square root of the thrust coefficient;
- a speed transducer for sensing the horizontal speed of the helicopter;
- means for combining said first and fourth signals for producing an output indicative of the altitude of the helicopter; and
- means for varying said output in response to the output of said speed transducer.

11. Helicopter ground-proximity measuring device, comprising:
- means for measuring the true wake of the helicopter rotor adjacent its center, and producing a first signal responsive thereto;
- means responsive to the thrust produced by said helicopter rotor and producing a second signal representative of the square root of the thrust coefficient;
- means for measuring the rotor speed and producing a third signal representative thereof;
- means for forming the product of said second and said third signals and producing a fourth signal representative thereof;
- means for producing a fifth signal representative of the horizontal velocity of the helicopter; and
- means for correlating the ratio of the first and fourth signals with the ratio of the fifth and fourth signals to produce a signal indicative of the altitude of the craft.

12. Helicopter ground-proximity measuring device, comprising:
- means for measuring the true wake of the helicopter rotor adjacent its center and producing a first signal responsive thereto;
- means for producing a second signal representative of the wake induced by the helicopter rotor;
- means for producing the ratio of the difference of said first and second signals over said second signal; and
- nonlinear transmission means for transforming said ratio into a signal indicative of the altitude of the helicopter.

13. Helicopter ground-proximity measuring device, comprising:
- means for measuring the true wake of the helicopter rotor adjacent its center and producing a first signal responsive thereto;
- means for producing a second signal representative of the wake induced by the helicopter rotor;
- means for producing the ratio of the difference of said first and second signals over the second signal;
- means for sensing the skew angle of the rotor;
- nonlinear signal transmission means for transforming said ratio into a signal indicative of the altitude of the helicopter; and
- means for varying the transmission characteristics of said transmission means in response to the output of said skew-angle sensing means.

14. Helicopter ground-proximity measuring device, comprising:
- means for measuring the true wake of the helicopter rotor adjacent its center and producing a first signal responsive thereto;
- means for producing a second signal representative of the wake induced by the helicopter rotor;
- means for producing a third signal representative of the product of rotor speed and of the square root of the thrust coefficient of the rotor;
- means for forming the ratio of the difference of said first and second signals over said third signal; and
- substantially exponential nonlinear transmission means for transforming said ratio into a signal indicative of the altitude of the helicopter.

15. Helicopter ground-proximity measuring device, comprising:
- means for measuring the true wake of the helicopter rotor adjacent its center and producing a first signal responsive thereto;
- means for producing a second signal representative of the wake induced by the helicopter rotor;
- means for producing a third signal representative of the product of rotor speed and of the square root of the thrust coefficient of the rotor;
- means for forming the ratio of the difference of said first and second signals over said third signal;
- substantially exponential nonlinear transmission means for transforming said ratio into a signal indicative of the altitude of the helicopter;
- means for sensing the forward speed of said helicopter and producing a fourth signal indicative thereof; and
- means for varying the transmission characteristics of said transmission means in response to the ratio of said fourth and third signals.

16. A helicopter ground-proximity measuring device, comprising:
- means for measuring the true wake of the helicopter rotor adjacent its center and producing a first signal responsive thereto;
- a rotor-speed measuring device producing a second signal responsive to the rotor speed;
- a blade angle potentiometer device sensing the pitch angle of the rotor blade, and producing a third signal in response thereto;
- means for combining said second and third signals and producing a fourth signal indicative of the induced hovering wake of said helicopter; and
- means for combining said first and said fourth signals for producing a signal indicative of the altitude of the helicopter.

17. A helicopter ground-proximity measuring device, comprising:
   means for measuring the true wake of the helicopter rotor adjacent its center and producing a first signal responsive thereto;
   a rotor-speed measuring device producing a second signal responsive to the rotor speed;
   a blade angle potentiometer device sensing the pitch angle of the rotor blade;
   means for combining the output furnished by said potentiometer device and said second signal and producing a third signal responsive to the thrust produced by said rotor;
   means responsive to said third and said second signals to produce a fourth signal indicative of the induced wake velocity; and
   means for combining said first and said fourth signals for producing a signal directly indicative of the altitude of the helicopter.

18. A helicopter ground-proximity measuring device, comprising:
   means for measuring the true wake of the helicopter rotor adjacent its center and producing a first signal responsive thereto;
   a rotor-speed measuring device producing a second signal responsive to the rotor speed;
   a blade angle potentiometer device sensing the pitch angle of the rotor blade, and producing a third signal in response thereto;
   means for combining said second and third signals and producing a fourth signal indicative of the induced hovering wake of said helicopter;
   a horizontal-speed measuring device producing a fifth signal responsive to the horizontal speed of the helicopter; and
   means for combining said first, fourth, and fifth signals for producing a signal indicative of the altitude of the helicopter.

19. A helicopter ground-proximity measuring device, comprising:
   means for measuring the true wake of the helicopter rotor adjacent its center and producing a first signal responsive thereto;
   a rotor-speed measuring device producing a second signal responsive to the rotor speed;
   a blade angle potentiometer device sensing the pitch angle of the rotor blade, and producing a third signal in response thereto;
   means for combining said second and third signals and producing a fourth signal indicative of the induced hovering wake of said helicopter;
   means for forming the ratio of the said first and fourth signals; and
   means for deriving a signal indicative of the altitude of the helicopter from said ratio.

No references cited.

LOUIS R. PRINCE, *Primary Examiner.*